United States Patent [19]

Matousek et al.

[11] Patent Number: 5,176,574
[45] Date of Patent: Jan. 5, 1993

[54] COMBINE CLEANING SYSTEM

[75] Inventors: Robert A. Matousek, Minooka; Jon E. Ricketts, Viola, both of Ill.; Richard Wildfong, Craik, Canada

[73] Assignee: Case Corporation, Racine, Wis.

[21] Appl. No.: 719,800

[22] Filed: Jun. 24, 1991

[51] Int. Cl.$^5$ ............................................. A01F 12/44
[52] U.S. Cl. ................................... 460/100; 460/101; 460/902; 209/394
[58] Field of Search ................... 460/100, 12, 13, 101, 460/102, 93, 902; 56/12.8, 209/394

[56] References Cited

U.S. PATENT DOCUMENTS

| | | | |
|---|---|---|---|
| 1,366,691 | 1/1921 | Humbke | 460/93 |
| 2,250,383 | 7/1941 | Koester | 209/394 X |
| 3,367,496 | 2/1968 | Cockle et al. | |
| 3,800,803 | 4/1974 | Rouse | 460/101 |
| 4,474,188 | 10/1984 | Kashino et al. | 460/13 |
| 4,502,493 | 3/1985 | Jones et al. | |
| 4,770,190 | 9/1988 | Barnett | |
| 5,041,059 | 8/1991 | Ricketts et al. | 460/902 X |

Primary Examiner—Terry Lee Melius
Attorney, Agent, or Firm—Dressler, Goldsmith, Shore, Sutker & Milnamow, Ltd.

[57] ABSTRACT

A combine cleaning system including a fan and a cleaning sieve which coact with each other to separate chaff and unthreshed tailings from grain. The sieve defines a grain cleaning area comprised of an air foil section extending rearwardly from a forward edge of the sieve and a slat or louvered section downstream of the air foil section. The air foil section provides a first level of cleaning to the threshed materials deposited on the grain cleaning area while the slat section provides a second level of cleaning to the material received thereon. Preferably, the air foil section comprises about 60% to about 85% of the grain cleaning area.

11 Claims, 3 Drawing Sheets

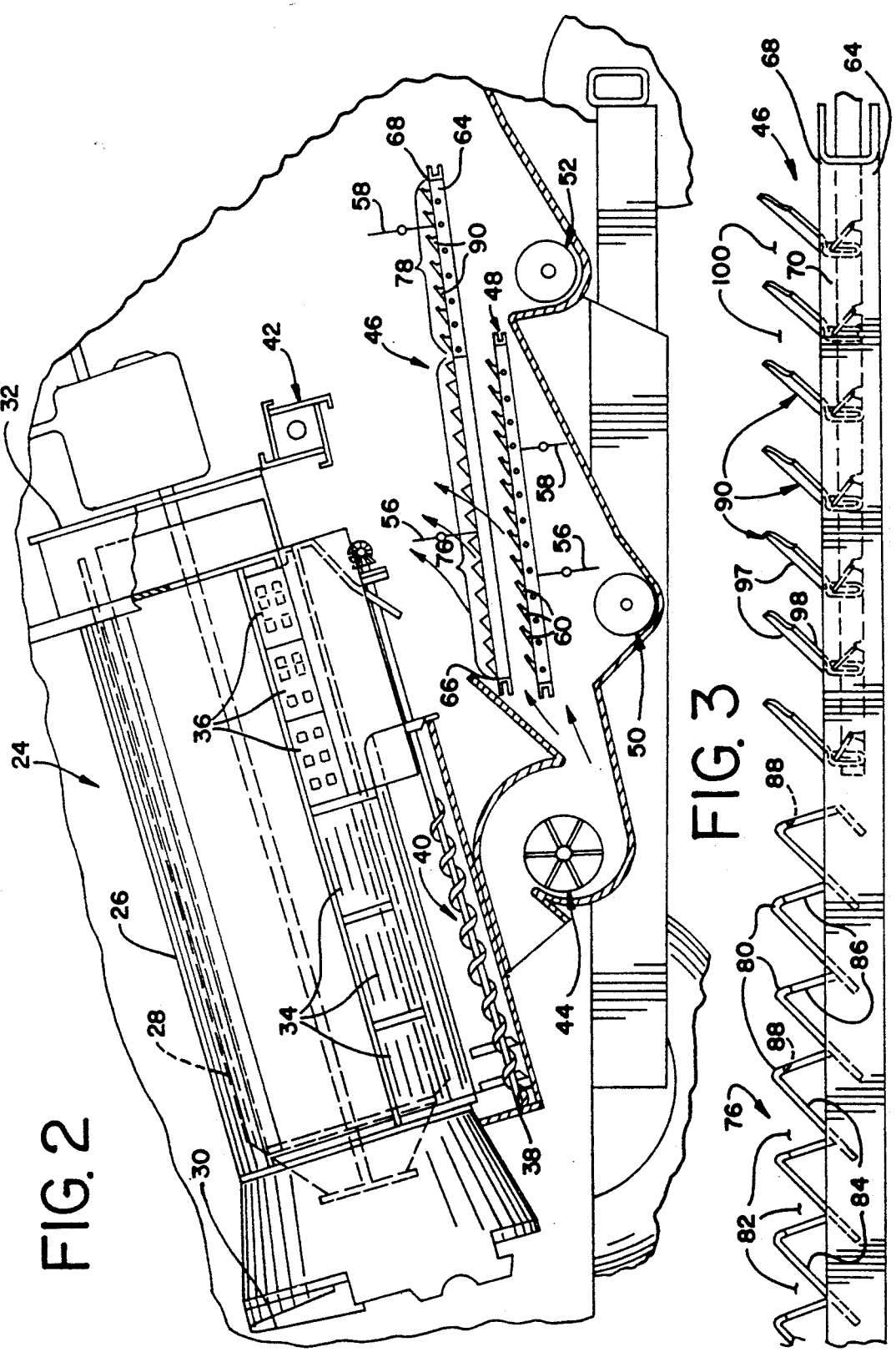

COMBINE CLEANING SYSTEM

FIELD OF THE INVENTION

The present invention generally relates to combines and, more particularly, to an improved cleaning system for a combine.

BACKGROUND OF THE INVENTION

A common and well known form of harvesting machine is a rotary combine. Rotary combines are available in various designs and models to perform the basic functions of harvesting, threshing, and cleaning of agricultural crop such as grain. As used herein, the term "grain" is meant to include corn, wheat, rye, oats, barley, flax seed, sorghum, soy beans, mixed grain, and any other food grains, feed grains, and oil seeds.

A typical combine includes a crop harvesting apparatus which reaps planted agricultural crop as the combine is driven across a field. A feeder mechanism arranged at the forward end of the combine operates in combination with the harvesting apparatus and feeds the harvested crop to a threshing apparatus arranged within a housing of the combine. The threshing apparatus separates the harvested crop into grain and material other than grain.

While the threshing apparatus acts to separate a substantial portion of the crop or grain from material other than grain, chaff and/or straw remains intermixed with the grain, and a further cleaning or separating action is normally required. Further separation is normally achieved in a cleaning section of the combine.

The cleaning section of a conventional combine is located to receive threshed materials including chaff, grain and other material expelled from the threshing apparatus. A typical cleaning section includes two sieves vertically arranged one above the other and a fan which produces a flow of air directed through the sieves. Reciprocation of the sieves facilitates arrangement of the threshed materials into a crop layer or mat on top of the sieves.

Separation of the grain from residue materials other than grain is facilitated by the air from the fan flowing upwardly through the sieves. The upwardly directed air creates a force which urges relatively light residue material including straw, chaff, and the like to float on top of the sieve and into an airborne state such that it may be directed toward and expelled from a discharge end of the combine. Heavier seeds or clean grain tend to move to the sieve and fall through a series of openings or passages into a clean grain collector.

Threshed materials passing to the uppermost sieve of the combine forms a conglomerate mass of grain and material other than grain which is difficult to separate and clean. As will be appreciated, the chaff acts to clog the sieve and, thereby, retard and sometimes inhibit clean grain from passing therethrough. As is evident from the prior art, considerable effort regarding fan design has been done over the years to produce an efficient flow of air which is necessary to provide a proper cleaning action for the threshed crop material.

The upper sieve of the cleaning section is designated a chaffer sieve, and the lower sieve is designated a grain sieve. The purpose of the chaffer sieve is to separate heavier grain particles from lighter chaff, straw, and other residue materials. The chaffer sieve also effects some sorting of materials received thereon by size. The purpose of the grain sieve is to provide a secondary cleaning action thereby inhibiting contamination of the grain passing into the clean grain collection. As will be appreciated, passing grain through two separate sieves during a cleaning process is a limiting factor which adversely effects combine capacity and productivity.

There are basically two separate and distinct sieve designs. One design proposes configuring the chaffer sieve as an air foil which provides a series of adjacent apertures of a fixed size over a grain cleaning area of the sieve. An air foil advantageously allows the majority of air presented to an undersurface thereof to flow therethrough. In high rate harvesting conditions, however, the fixed size of the air foil apertures lacks the ability to separate grain from material other than grain. Consequently, a large portion or percentage of threshed material including grain is passed over the discharge end of the air foil and is lost to the ground thereby adversely effecting combine productivity.

Another sieve design involves a series of angularly adjustable louvers or slats which define open passages between confronting surfaces of adjacent louvers. The angular adjustability of the louvers allows the size of the opening or passage between louvers to be changed or adjusted. The air flow through the passages defined between the louvers is less than an air foil design. Moreover, the laterally elongated openings between confronting surfaces of adjacent louvers allows elongated materials, such as straw and the like, to pass therebetween. Successful operation of a louver-type sieve relies in large part on the proper opening between louvers. If these openings are too small for the particular material being harvested, there is naturally a significant increase in the thickness of the layer of materials on the sieve, and thus, the effectiveness of the fan is diminished. If the openings or passages between the louvers of the sieve are too large, material other than grain passes through the sieve. Carefully regulated control of the openings is difficult to achieve and, furthermore, consumes valuable time which is at a premium during a harvesting operation.

Thus, there is a need and a desire for a sieve which provides a beneficial flow of air therethrough and yet limits the amount of grain passing from a discharge end thereof.

SUMMARY OF THE INVENTION

In view of the above, and in accordance with the present invention, there is provided a combine cleaning system including a fan and a sieve which coact with each other to separate grain from material other than grain. The fan provides a substantially uniform flow of air to the sieve. The sieve defines a grain cleaning area comprised of an air foil section extending rearwardly from a forward edge of the sieve and a slat or louvered section downstream of the air foil section. The air foil section is configured to provide an increased flow of air therethrough as compared to the slat section whereby providing a first level of cleaning to threshed materials deposited on the grain cleaning area. The slat section provides a second level of cleaning to the materials received thereon. Preferably, the air foil section comprises about 60% to about 85% of the grain cleaning area.

The fan and sieve are mounted in a housing of the combine. To enhance separation of the grain from material other than grain, the fan has a relatively high output directed upwardly through the grain cleaning area of the sieve. The upwardly directed flow of air urges unwanted residue into an airborne state and toward an outlet end of the combine.

The air foil section of the sieve defines a series of adjacent passages which promote passage of air therethrough to facilitate cleaning of the threshed material. The passages in the air foil section have a fixed size in first and second directions to provide granular sizing or sorting capability to the air foil section of the sieve. Moreover, the passages in the air foil section open toward a rear discharge section of the sieve and, therefore, material is blown downstream from the air foil section to the slat section of the sieve.

The slat section of the sieve includes a series of laterally extending slats or louvers defining a series of laterally extending passages between upper and lower confronting surfaces of adjacent louvers. Preferably, each louver defines a plurality of laterally adjacent fingers which provide a sorting action upon the material moving therepast. In a preferred form of the invention, the sieve further includes a mechanism for angularly adjusting the louvers relative to each other thereby effecting the level of cleaning provided by the slat section of the sieve.

In a preferred form of the invention, the cleaning system includes a chaffer sieve and a grain sieve reciprocally arranged in the housing of the combine in vertically spaced relation to each other. Both sieves are arranged such that the air from the fan passes upwardly therethrough and substantially evenly thereacross. The chaffer sieve defines a grain cleaning area comprised of an air foil section and a slat section. The air foil section of the chaffer sieve provides a cleaning and separating effect to the threshed materials received from a threshing apparatus of the combine and allows clean grain to gravitate toward the grain sieve. The slat section of the chaffer sieve extends the grain cleaning area rearwardly from a discharge end of the air foil section to provide a cleaning effect to threshed materials received from the threshing apparatus and an additional cleaning effect to materials received downstream from the air foil section. The slat section extends the chaffer sieve rearwardly beyond a rearmost end of the grain sieve such that materials passing through the slat section get recirculated to the threshing apparatus whereat the material is rethreshed to reduce the amount of grain discharged from the combine.

A salient feature of the present invention involves providing a combine cleaning system with at least one sieve having, at its forward end, an air foil section and a slat section arranged downstream of the air foil section. Such sieve structure embodies both the beneficial air flow characteristics of an air foil and the beneficial cleaning effects of a louvered sieve. Providing a louvered or slat section to the rear of the sieve allows larger openings to be provided at a rear end of the sieve to allow threshed materials that would otherwise be blown off the discharge end of the air foil to be recirculated and rethreshed thereby reducing grain loss from the combine.

Numerous other features and advantages of the present invention will become readily apparent from the following detailed description, the accompanying drawings, and the appended claims.

BRIEF DESCRIPTION OF THE DRAWINGS

FIG. 2 is an enlarged partial cross-sectional side elevational view of a preferred threshing apparatus and cleaning system according to the present invention;

FIG. 3 is a side elevational view of a sieve associated with the present invention;

DETAILED DESCRIPTION OF A PREFERRED EMBODIMENT

Figure 1:
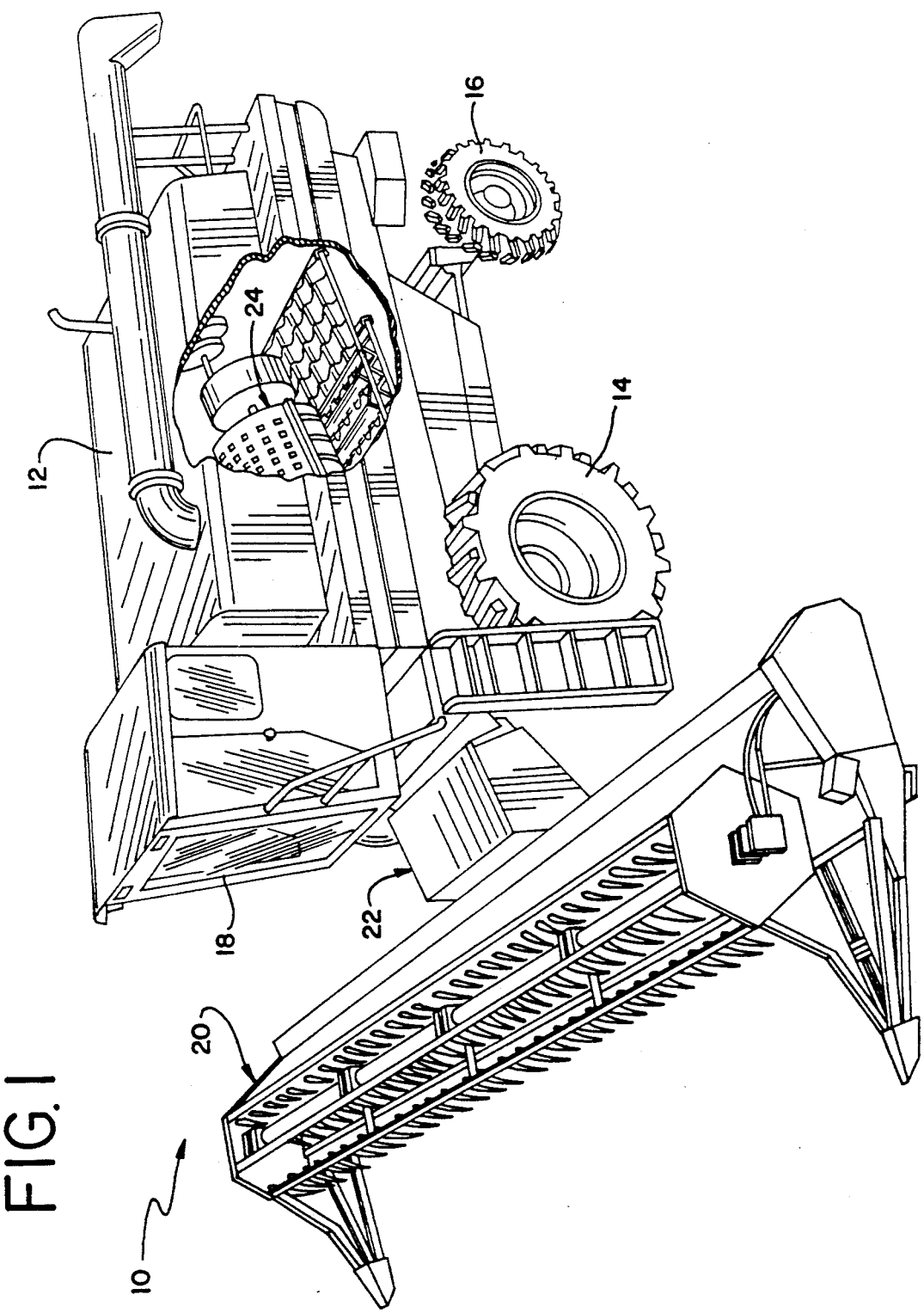
FIG. 1 illustrates a perspective view, partially broken away, of a combine.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is shown in FIG. 1 a self-propelled combine 10. The combine 10 is preferably of the type marketed by the assignee herein and sold under Model No. 1600. The combine 10 includes a body or housing 12 supported on front drive wheels 14 and steerable rear wheels 16. The combine is powered by an engine (not shown) and controlled from an operator station 18. A crop harvesting apparatus or header 20 and a feeder mechanism 22 are attached at a forward end of the combine. The feeder mechanism 22 feeds harvested crop material to a threshing apparatus 24 supported and enclosed by housing 12.

Turning to FIG. 2, the threshing apparatus 24 is preferably a conventional axial-flow type and includes a threshing cage 26 and a rotor 28. It should be appreciated, however, that the principles of the present invention equally apply to combines having a threshing apparatus other than the axial-flow type. As illustrated, the threshing cage 26 has a generally cylindrical and at least partially foraminous configuration with the rotor 28 mounted for rotation therewithin. The rotor 28 is driven from the engine and directs harvested agricultural crop to be threshed from an inlet or upstream end 30 of the separating apparatus toward an exit or downstream end 32.

Between the upstream and downstream ends of the threshing apparatus 24, the harvested crop is threshed several times repeatedly, but gently, as it spirals around the single large diameter rotor 28 and passes through the threshing cage 26. In a conventional manner, suitable instrumentalities on the rotor 28 cooperate respectively with semi-cylindrical concaves 34 and semi-cylindrical grates 36 provided on the threshing cage.

Threshed materials including grain along with chaff, straw and other residue materials fall from the threshing apparatus 24 onto a grain pan 38. The threshed material is conveyed rearwardly from the pan 38 by an auger mechanism 40 for subsequent cleaning and collection. Other residue material is impelled rearwardly out of the discharge end 32 of the threshing apparatus 24 where a rotary beater 42 throws the straw and other residue material rearwardly from the combine.

A substantial portion of chaff, straw, and other residue material remains intermixed with the grain impelled from the threshing apparatus 24 and a further cleaning or separating action is normally required. Therefore, the combine 10 further includes a cleaning system for further separating chaff, straw, tailings, and other foreign matter from the clean grain.

In the illustrated embodiment, the cleaning system includes a cleaning fan 44, a chaffer sieve 46, and a grain sieve 48. The combine 10 further includes, in fore-and-aft relation relative to each other, a conventional clean grain auger 50 for conveying clean grain out of the combine and a return auger 52 which returns threshed materials back to the threshing apparatus 24 for rethreshing and further cleaning.

Cleaning fan 44 extends transversely across substantially the entire width of the combine 10. More specifically, fan 44 is transversely mounted for rotation within the housing 12 beneath the threshing apparatus 24 and forward of the cleaning sieves 46 and 48. The cleaning fan is preferably of the type shown and described in co-assigned U.S. Pat. No. 4,906,219 to R. Matousek, et al. Suffice it to say, fan 44 produces a relatively high output (between about 9,000 cfm and about 12,000 cfm over 30 square feet) and a substantially uniform directed flow of air upwardly and rearwardly through the cleaning sieves 46 and 48 to urge chaff and other residue in the threshed grain into an airborne state and toward a discharge end of the combine.

Sieves 46 and 48 are located in the housing 12 for receiving and sifting threshed materials and such that the flow of air from the fan 44 passes upwardly therethrough to urge residue in the threshed materials into an airborne state away from the respective sieves and toward the discharge end of the threshing apparatus 24. Each sieve 46, 48 is supported for fore-and-aft reciprocation or oscillation by a pair of arms 56 and 58. As will be appreciated, reciprocation of the sieve facilitates arrangement of the threshed material over the entirety of the sieve and tends to separate clean grain from chaff, straw, tailings, and other residue material so that the clean grain gravitates toward and falls through the sieve.

As shown in FIG. 2, the grain sieve 48 is arranged beneath and in grain receiving relation with the chaffer sieve 46. The grain sieve 48 is of conventional structure and preferably includes a series of angularly adjustable slats or louvers 60.

A salient feature of the cleaning system of the present invention concerns the structure of the chaffer sieve 46. The chaffer sieve 46 includes a generally rectangular frame 64 having a forward edge 66, a rear discharge edge 68, and opposite side edges 70 and 72 (FIGS. 3 and 5, respectively) defining a grain cleaning area therebetween. Unlike conventional sieves, however, the grain cleaning area of the chaffer sieve 46 is defined by an air foil section 76 and a slat or louvered section 78.

The air foil section 76 of sieve 46 rearwardly extends from the forward edge 66 of the sieve and receives a majority of the threshed material from grain pan 38 and threshing apparatus 24. The air foil section 76 provides a first level of cleaning to the threshed material. The slat section 78 rearwardly extends from the discharge end of the air foil section 76. The slat section 78 provides a second level of cleaning to the threshed material received thereon and limits the amount of material exhausted from the rear discharge end of sieve 46.

The air foil section 76 extends over greater than fifty percent of the grain cleaning area of sieve 46. In a most preferred form, the air foil section 76 comprises about 60% to about 85% of the grain cleaning area of sieve 46. As schematically illustrated in FIG. 2, the air foil section 76 of sieve 46 extends rearwardly from a forward edge 66 of frame 64 and extends over substantially the entire length of grain sieve 48.

Figure 4:
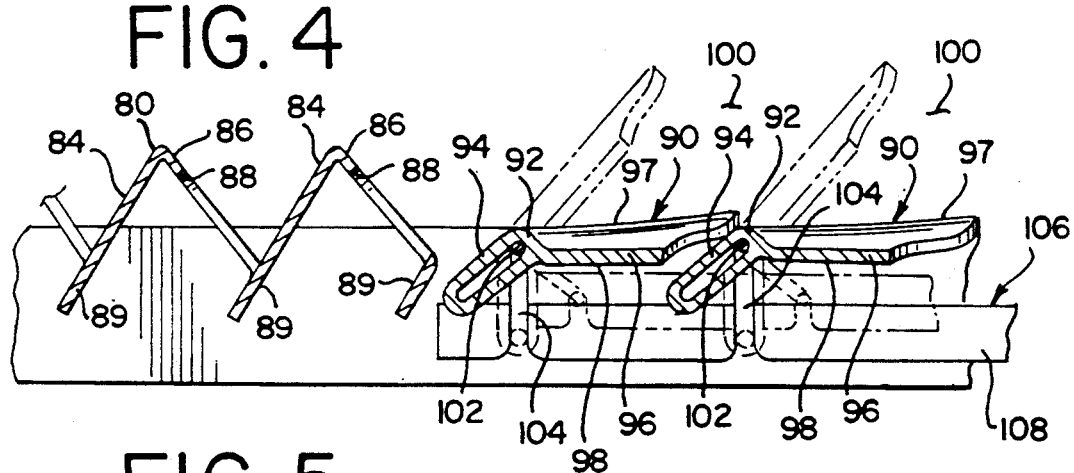
FIG. 4 is an enlarged fragmentary cross-sectional side elevational view of a sieve embodying principles of the present invention.
Figure 5:
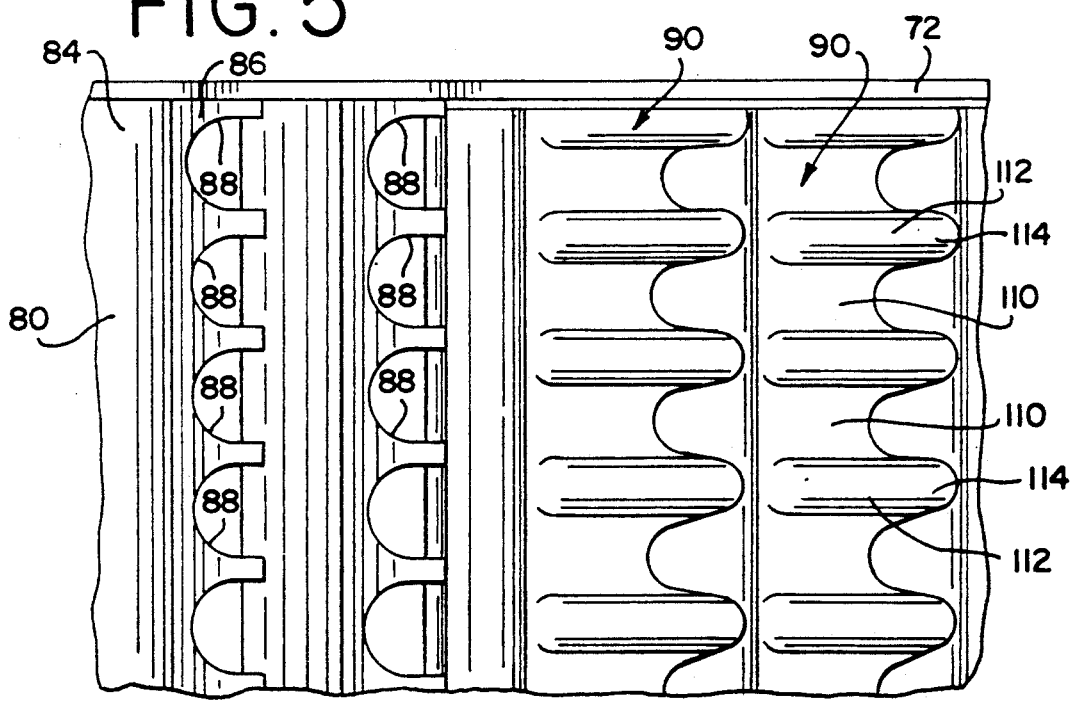
FIG. 5 is a fragmentary plan view of a sieve embodying principles of the present invention.

Turning to FIGS. 3 through 5, the air foil section 76 is preferably formed with a series of inverted V-shaped and parallel upstruck or ribs 80 extending laterally across the width of sieve 46 so as to form recessed spaces 82 between adjacent ridges. Adjacent ridges are interconnected to each other, and each ridge 80 is secured at opposite ends to side edges 70 and 72 of frame 64. In the illustrated embodiment, each ridge 80 includes an angled forward wall 84 and an angled rear wall 86. The rear wall 86 of each ridge defines a series of laterally adjacent openings or passages 88 which allow a directed flow of air to pass through the air foil section 76 toward a rear discharge end of the frame 64 of sieve 46.

Each opening or passage 88 has a fixed size in first and second directions to facilitate cleaning of the threshed grain material deposited thereon. The size of each opening 88 ranges between about 0.500 inches to about 0.875 inches in length and about 0.500 inches to about 0.875 inches in width. In a most preferred form, each opening 88 measures about 0.750 inches in both length and width.

As shown in FIG. 4, a laterally elongated air baffle 89 depends from a lower surface of the air foil rearwardly of each opening to direct air upwardly through the openings 88.

The slat section 78 of sieve 48 extends rearwardly from the air foil section 76 and comprises the remainder of the grain cleaning area. As best shown in FIG. 2, the slat section 78 extends beyond the rear end of grain sieve 46. Slat section 78 provides a second level of cleaning to the materials received from air foil section 76 and allows grain material to gravitate toward the return auger.

The slat section 78 is comprised of a plurality of series of laterally elongated slats or louvers 90 arranged in an adjacent relationship relative to each other. Each of the slats or louvers 90 can be fabricated from metal or from a non-metallic material such as nylon material impregnated with glass fibers and suitable to the environment in which the combine is operated.

Turning to FIG. 4, each slat 90 has a central portion 92 with two leg portions 94 and 96 extending in angularly offset directions therefrom. As illustrated, leg portion 94 of each slat 90 is provided with a major upper surface 97 and a major lower surface 98. A series of openings or passages 100 is defined between confronting upper and lower surfaces of adjacent slats.

To provide versatility to the slat section 78 and to regulate the cleaning level thereof by modulating the size of openings 100, slat section 78 is preferably structured to allow the slats 90 to be angularly adjusted relative to each other. In a preferred form, a transversely elongated pivot rod 102 is connected to the central portion 92 of each slat 90 and controls the angular disposition thereof. Opposite ends of the pivot rod 102 are conventionally mounted on or extend through the frame 64. Intermediate its ends, each pivot rod 102 is provided with a U-shaped crank 104 which engages with a linearly displacable adjustment mechanism 106 including an endwise slotted bar or member 108. As will be appreciated, endwise movement of the adjustable member 108 will result in rotational movement of the pivot rod 102 about its longitudinal axis and, thus, angular displacement of a respective slat. By this arrangement, the slats 90 can be adjusted to any position between fully closed (illustrated in solid lines in FIG. 4) and fully opened (illustrated in phantom lines in FIG. 4).

As illustrated in FIG. 5, each slat 90 preferably has an undulating or corrugated cross-sectional configuration. The configuration of each slat 90 provides a lower groove portion 110 extending between raised and adjacent crest or ridge portions 112. As shown, each slat 90 is further provided with fore-and-aft extending and laterally adjacent finger portions 114 which preferably extend from crest portions 112 of each slat 90 to facilitate the separation of grain from material other than grain.

In operation, the harvesting apparatus 20 reaps the agricultural crop as the combine is driven across the field. The feeder mechanism 22 delivers the agricultural crop to the inlet end 30 of the threshing apparatus 24. Cooperative instrumentalities on the threshing apparatus 24 impel threshed materials from the threshing apparatus into the grain pan 38 from whence the threshed material moves onto the chaffer sieve 46. While the threshing apparatus 24 acts to separate grain from material other than grain, a substantial amount of chaff, straw, trailings, and etc. may be directed out of the openings in the threshing apparatus 24 along with the grain, and a further cleaning or separating action is required.

Subsequent cleaning of the threshed material is facilitated by the air flowing from the fan 44 upwardly through the air foil section 76 of sieve 46. As will be appreciated, the air flows upwardly through the first series of passages 88 defined by the air foil section 76. Air baffles 89 facilitate the upward flow of air through the air foil section 76 of sieve 46. Moreover, the openings 88 in the air foil section also grade or sort the threshed material in a manner allowing clean grain to fall through the sieve while moving the remaining material toward the rear end of the sieve 48.

Slat section 78 receives threshed materials blown rearwardly from the air foil section 76 and provides a further cleaning action thereon. As will be appreciated, the openings 100 allow grain that would normally be lost or wasted to the ground with sole use of an air foil, to pass through the sieve 46 and gravitate to the return auger 52. The return auger 52 allows the material received thereby to be recirculated to the threshing apparatus whereat the material is rethreshed to reduce the amount of grain discharged from the combine.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A combine cleaning system having a housing supporting and enclosing means for threshing harvested crop to separate harvested grain from material other than grain, said cleaning system comprising:

fan means mounted on said combine for providing a substantially uniform flow of air; and sieve means located in said housing to receive harvested grain and materials other than grain from said threshing means and such that the flow of air from said fan means separates the harvested grain from and urges materials other than grain into an airborne state for discharge downstream of said sieve means, said sieve means comprising first and second cleaning sections arranged in a fore-and-aft relationship relative to each other, said first cleaning section extending rearwardly from a forward edge of and along a portion of said sieve means and being configured with a perforated sieve body including parallel ribs allowing an increased flow of air upwardly therethrough as compared to said second cleaning section thereby providing a first level of cleaning which separates harvested grain from materials other than grain and allowing the harvested grain to gravitate toward first receiving means provided on said combine, and with said second cleaning section extending rearwardly from a discharge end of said first cleaning section for receiving materials therefrom, said second cleaning section including a series of adjustable slat means for providing a second level of cleaning which further separates harvested grain from material other than grain and allowing the harvested grain to gravitate toward second receiving means provided on said combine.

2. The combine cleaning system according to claim 1 wherein the perforations in said first cleaning section have a fixed size in first and second directions thereby promoting separation of harvested grain from material other than grain as by size, and wherein said slat means of said second cleaning section define a series of passages which are relatively narrow in the first direction and elongated in the second direction, said first and second directions extending generally normal to each other.

3. The combine cleaning system according to claim 1 wherein said first cleaning section extends over at least one half the area of said sieve means, with said second cleaning section comprising the remaining area of said sieve means.

4. A combine cleaning system having a housing, a threshing assembly mounted within said housing for threshing crop material, said cleaning system comprising:

relatively high output fan means mounted on said combine for providing a directed and substantially uniform flow of air; and reciprocally mounted sieve means located in said housing for receiving and sifting threshed materials received from said threshing assembly and such that the directed air flow from said fan means passes upwardly through said sieve means to urge unwanted residue in said threshed material into an airborne state and toward an outlet end of the combine, said sieve means including a generally rectangular frame having a forward edge, a rear discharge edge, and opposite side edges defining a grain cleaning area therebetween, air foil means including a perforated sieve body allowing an upwardly directed flow of air through the air foil means and including a plurality of parallel ribs extending between the side edges of and rearwardly from said forward edge of the frame to define at least one-half the grain cleaning area of the sieve, and slat means extending between the side edges of the frame and rearwardly from the air foil means for defining the remainder of the grain cleaning area, and wherein the perforated sieve body of said air foil means is configured to provide enhanced air flow upwardly therethrough as compared to said slat means.

5. The combine cleaning system according to claim 4, further including means for angularly adjusting said slat means relative to each other thereby effecting sieve cleaning effectiveness.

6. The combine cleaning system having a crop harvesting apparatus and a feeder mechanism mounted to a forward end of the combine, a housing enclosing an apparatus capable of threshing crop material introduced to said apparatus and impelling threshed material therefrom, said cleaning system comprising:
 relatively high output fan means mounted on said combine for producing a substantially uniform and directed flow of air;
 a reciprocally mounted gain sieve located in said housing such that the flow of air from said fan means passes upwardly therethrough; and
 a reciprocally mounted chaffer sieve located in said housing above said grain sieve such that the flow of air from said fan means passes upwardly therethrough, said chaffer sieve defining a cleaning area comprising first and second cleaning sections, said first cleaning section including a perforated sieve body including a plurality of upstruck parallel ribs extending transversely across said chaffer sieve and rearwardly from a forward end of said chaffer sieve to allow a flow of air to move upwardly therethrough to provide a cleaning effect to threshed materials received from said apparatus and allowing grain to gravitate toward said grain sieve, and with said second cleaning section including a plurality of slats transversely extending across said sieve means and extending rearwardly from a rear end of said first cleaning section to provide an additional cleaning effect to materials received downstream from said first cleaning section, said slat means extending rearwardly beyond a rearmost end of said grain sieve such that material passing through said slat means gravities toward a mechanism mounted within said housing to recirculate material to said separating apparatus for rethreshing thereby reducing the amount of clean grain discharged from the combine.

7. The cleaning system for a combine according to claim 6 wherein said first cleaning section defines between 60% and about 85% of said cleaning area.

8. The combine cleaning system according to claim 6 wherein said second cleaning section comprises a series of laterally extending louvers defining laterally elongated passages between upper and lower surfaces of adjacent louvers to allow grain to pass through said chaffer sieve.

9. A combine sieve comprising:
 a substantially rectangular frame having a forward edge, a rearward discharge edge, and opposite side edges defining a grain cleaning area therebetween;
 air foil means including a perforated sieve body including a plurality of parallel ribs extending between said side edges and rearwardly from a forward edge of said frame for defining at least one-half the grain cleaning area of the sieve, with the perforations in said air foil means opening toward a rear discharge end of said frame; and
 slate means extending between said side edges and extending from a discharge end of said air foil means for defining the remainder of the grain cleaning area of the sieve.

10. The combine sieve according to claim 9 further including means for adjusting said slat means to thereby modify the openings therebetween.

11. The combine sieve according to claim 9 wherein said air foil means comprises from about 60% to about 85% of the grain cleaning area of said sieve with said slat means comprising the remainder of the grain cleaning area.

* * * * *